United States Patent
Ferring et al.

(10) Patent No.: US 11,530,956 B2
(45) Date of Patent: Dec. 20, 2022

(54) CAPACITIVE SENSOR ARRANGEMENT

(71) Applicant: IEE INTERNATIONAL ELECTRONICS & ENGINEERING S.A., Echternach (LU)

(72) Inventors: Daniel Ferring, Zemmer (DE); Erik Holzapfel, Prüm (DE); Laurent Lamesch, Reichlange (LU); Jochen Landwehr, Trier (DE); Michael Pütz, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 47 days.

(21) Appl. No.: 16/626,706

(22) PCT Filed: Jun. 22, 2018

(86) PCT No.: PCT/EP2018/066797
§ 371 (c)(1),
(2) Date: Dec. 26, 2019

(87) PCT Pub. No.: WO2019/002140
PCT Pub. Date: Jan. 3, 2019

(65) Prior Publication Data
US 2020/0139914 A1    May 7, 2020

(30) Foreign Application Priority Data

Jun. 29, 2017   (LU) .................................. 100330

(51) Int. Cl.
*G01R 27/26* (2006.01)
*G01L 1/14* (2006.01)
(Continued)

(52) U.S. Cl.
CPC .............. *G01L 1/144* (2013.01); *B60N 2/002* (2013.01); *B60R 21/01532* (2014.10); *G01D 5/24* (2013.01)

(58) Field of Classification Search
USPC .......................... 324/658, 660–663, 679, 686
See application file for complete search history.

(56) References Cited

U.S. PATENT DOCUMENTS 9,151,792 B1 * 10/2015 Kremin .................. G06F 1/169
2002/0024344 A1    2/2002 Kato et al.
(Continued)

FOREIGN PATENT DOCUMENTS

DE      102008021947 A1    11/2009
WO      WO2014122197 A1     8/2014

OTHER PUBLICATIONS

International Search Report corresponding to International application No. PCT/EP2018/066797, dated Sep. 10, 2018, 4 pages.
(Continued)

*Primary Examiner* — Vincent Q Nguyen
(74) *Attorney, Agent, or Firm* — Reising Ethington P.C.

(57) ABSTRACT

A capacitive sensor arrangement includes a sensing electrode having a capacitance (Cx) which depends on the presence of an object in a detection space; a measurement device connected to the sensing electrode and configured to detect the capacitance (Cx) of the sensing electrode; and a conducting structure, wherein the capacitance (Cx) of the sensing electrode depends on a potential of the conducting structure. In order to obtain a reliable capacitive measurement, the measurement device is connected to a power supply between a first potential (Vs) and a second potential (GND), the measurement device being connected to the second potential exclusively via the structure.

15 Claims, 1 Drawing Sheet

(51) Int. Cl.
*B60R 21/015* (2006.01)
*B60N 2/00* (2006.01)
*G01D 5/24* (2006.01)

(56) References Cited

U.S. PATENT DOCUMENTS

| | | | |
|---|---|---|---|
| 2006/0164254 A1* | 7/2006 | Kamizono | B60R 21/01532 |
| | | | 340/667 |
| 2010/0102833 A1 | 4/2010 | Uno et al. | |
| 2011/0221459 A1 | 9/2011 | Uno et al. | |
| 2013/0334844 A1* | 12/2013 | Lamesch | B60R 21/01532 |
| | | | 297/180.12 |
| 2015/0367751 A1 | 12/2015 | Lamesch et al. | |
| 2018/0022374 A1* | 1/2018 | Fujikawa | H03K 17/962 |
| | | | 219/204 |

OTHER PUBLICATIONS

Written Opinion corresponding to International application No. PCT/EP2018/066797, dated Sep. 10, 2018, 6 pages.

\* cited by examiner

CAPACITIVE SENSOR ARRANGEMENT

TECHNICAL FIELD

The present invention generally relates to a capacitive sensor arrangement.

BACKGROUND OF THE INVENTION

Capacitive sensors today are used for a vast variety of applications, like input devices (e.g. touchpads, capacitive sliders, touch wheels, etc.), proximity sensors or occupant detection systems.

There are many different types of capacitive sensors known in the art, but most of them rely on the following principle. A sensing electrode is disposed so that an approaching object (person, hand, finger or the like) changes the capacitance of the electrode with respect to ground. This changing capacitance is measured by a measurement circuit or measurement device. For instance, the sensing electrode may be connected to an alternating voltage, e.g. a square-wave voltage, and the current through the sensing electrode, which depends on its capacitance, can be converted by the measurement circuit into a voltage. This voltage is indicative of the capacitance and thus may be used to determine whether an object is near the electrode.

However, in many cases, the total capacitance of the sensing electrode to ground is also influenced by conducting objects or structures permanently in the vicinity of the electrode. E.g. in the case of an occupancy sensor, metal components of the respective vehicle seat (a seat frame or the like) influence the capacity of the sensing electrode. In other applications, the sensor arrangement may be used for hands-off detection, i.e. to detect whether at least one of the driver's hands is in contact with the steering wheel or not. In that case, the conducting object or structure is part of the vehicle steering wheel, e.g. the steering wheel frame or steering wheel core. However, such a conducting object could also be a ground electrode that is a dedicated part of a sensor arrangement and that is used to shape or influence the electric field of the sensing electrode. The electric field between the electrode and the respective object differs considerably depending on whether the object is connected to ground (thus having a defined potential) or not (thus having an undefined or "floating" potential). If the connection to ground is maintained, the respective object accounts for an offset in the capacitive measurements. However, in some applications, it is difficult to guarantee a connection to ground for the service lifetime of the sensor. Thus, especially for safety-relevant systems, it is necessary to monitor the grounded condition of the respective structure.

Presently, there are two concepts of performing such monitoring. According to a first concept, the structure is connected by two separate wires to the measurement device. One wire provides the ground potential and the second wire is used for monitoring the connection between the measurement device and the structure. According to a second concept, the structure is connected to the measurement device with one wire which provides the ground potential during the capacitive measurements. In a diagnostics mode, the wire is used to apply an AC current to the structure, which current is measured. If the AC current is above a threshold, it can be concluded that the structure is still connected to the connection wire and to ground. This approach, which is described in WO 2014/122197 A1, although reliable, is rather complicated, since it requires a dedicated circuitry for the diagnostics mode.

US 2010/0102833 A1 discloses a sitting detection system with a sheet-like detection electrode that is disposed near a seat frame and that is connected to an electronic control unit (ECU) with a voltage application circuit and a voltage detection circuit. The electrode is connected to the ECU via a lead wire and a shielded cable. The shielding of the cable is connected on the one hand to ground via the ECU and on the other hand to the seat frame, which has a ground connection independent of the ECU. As similar setup is disclosed in US 2011/0221459 A1.

US 2002/0024344 A1 discloses a detection element with a detection electrode, a ground electrode and a charge plate disposed in between. The ground electrode is connected to an attachment part which is connected to ground. A circuit board is disposed on the detection electrode and is connected between a positive and a negative terminal of a power supply. According to some embodiments, the negative terminal is connected to the ground electrode.

WO 2014/122197 A1 discloses a capacitive sensor for a vehicle seat, with an antenna electrode and a control and evaluation circuit, which in a first mode of operation measures an alternating current between the antenna electrode and ground. A seat frame connector is disposed to connect the control and evaluation circuit to a seat frame and in a second mode of operation, the control and evaluation circuit measures an electrical current flowing into the seat frame connector.

SUMMARY

It is therefore desirable to provide means for a reliable capacitive measurement.

This problem may be solved by a capacitive sensor arrangement according to claim 1.

The invention provides a capacitive sensor arrangement for detecting an object. The application of the sensor arrangement is not limited in any way, but it may be in particular be used in automotive systems, e.g. as an occupancy sensor for a vehicle seat or a sensor for a smart trunk opener or a capacitive sensor for hands-off detection in a steering wheel.

The sensor comprises a sensing electrode having a capacitance which depends on the presence of the object in a detection space. In other words, the capacitance of the sensing electrode depends on whether the object is in the detection space or not. In this context, "detection space" refers to a space where the presence of the object (significantly) influences the capacitance. It is understood that such a detection space is at least partially in the proximity of the sensing electrode, and may in particular be adjacent to the sensing electrode. Of course, the sensor arrangement may comprise a plurality of sensing electrodes.

A measurement device is connected to the sensing electrode and is configured to detect the capacitance of the sensing electrode. Here and in the following, unless otherwise specified, "connected" is to be understood as "electrically connected". Detecting the capacitance means that the measurement device measures at least one quantity from which the capacitance can be derived. Normally, the measurement device is configured to apply an alternating voltage to the sensing electrode. It is preferred that the alternating voltage is periodic and thus can be characterized by a (base) frequency. The measurement device may be connected directly to the sensing electrode, but there may also be other elements in between. In order to detect the capacitance, the measurement device may apply a voltage having known characteristics and detect the resulting current flowing into the sensing electrode.

Furthermore, the sensor arrangement comprises a conducting structure, wherein the capacitance of the sensing electrode depends on a potential of the structure. An example of such a conducting structure is a metal structure permanently in the vicinity of the sensing electrode, which may be necessary e.g. for mechanical reasons. For example, the conducting structure may be a support for other elements (or even the sensing electrode itself). Normally, the conducting structure has no direct electrical connection to the sensing electrode. As a voltage is applied to the sensing electrode, an electric field is generated, which also influences charge carriers within the conducting structure. If the structure is e.g. connected to ground, therefore having a defined electrical potential, part of the current flowing into the sensing electrode flows via the grounded structure to ground and thus influences the capacitive sensing in a well-defined manner. However, if the conducting structure has an undefined or floating potential, there will be no significant current flowing through the conducting structure towards ground and consequently the sensing current flowing into the sensing electrode is reduced. Even if the potential is well-defined, the electric field between the sensing electrode and the structure, and therefore the capacitance, is influenced by the value of the potential. In other words, if the potential of the conducting structure changes during the service time of the sensor arrangement, this could falsify the capacitance-based detection of the object. It should be noted that the potential of the structure does not necessarily be DC ground potential, it can also be the 12V potential of the vehicle battery or a power supply line. Important is that the monitored structures appear for the measurement signal as a defined (AC) GND. Even the power supply line is for the typically used measurement frequency in capacitive measurement systems via the battery on AC-GND.

The measurement device is configured to connect to a supply of power between a first potential (or node) and a second potential (or node), the measurement device being connected to the second potential exclusively via the structure. In order to supply the measurement device with power, it is connected (directly or indirectly) on the one hand to a first potential and on the other hand a second potential. It is understood that the first and second potential have to be different. The measurement device is connected between the first and the second potential as an electric load.

In order to operate the measurement device, an electrical current flows between the first and the second potential through the measurement device. In other words, operability of the measurement device depends on its connection to the first potential and to the second potential. The measurement device is only (fully) operable if it is at least indirectly connected to the first potential and to the second potential. In some embodiments, the measurement device may retain a reduced operability even one of these connections is not present. For example, the measurement device could have some additional power supply that is independent of the first and/or the second potential.

The measurement device is connected to the second potential exclusively via the conducting structure. "Exclusively via the structure" means that there is no connection to the second potential other than through the structure. In other words, during normal operation, the structure is electrically connected between the second potential and the measurement device. Could also see that the second potential is routed through the conducting structure to the measurement device. There is no connection between the measurement device and the second potential that is independent of the structure. Therefore, as long as the structure is connected to the second potential and its connection to the measurement device is intact, the measurement device is (fully) operable. If the measurement device is not (fully) operable, the structure is either not connected to the second potential or the structure has been disconnected from the measurement device. In the first case, the structure no longer has a defined potential, wherefore any measurements of the capacitance would be falsified. In the second case, it would be impossible to monitor the potential of the structure, which would also make the measurements unreliable. In both cases, where any measurements would be unreliable, the measurement device becomes (at least partially) inoperable so that normally no more measurements are conducted. In other words, any loss or uncertainty of the defined potential of the structure becomes evident by the interoperability of the measurement device. Therefore, the sensor arrangement does not need any diagnostic mode or complicated additional circuitry in order to verify the defined potential of the structure.

In general, the second potential should be any kind of defined potential and could e.g. be the 12 V-voltage of a car battery. In such a case, the structure would have a ground shift voltage, i.e. a potential that differs from ground potential but that is still a defined potential. Preferably, though, the second potential is ground potential. In a vehicle, this is normally the potential of the vehicle body.

Normally, the measurement device is connected to the structure by a first connecting line. The first ground line can be any kind of conductor path, wire or cable adapted to conduct electrical current. It may also be a bundle of wires. Normally, the first connecting line is a simple conductor, but some electronic element like a resistor, an inductor and/or a capacitor could be connected between the measurement device and the structure. All other lines mentioned below are also normally simple conductors but could optionally contain some electronic element.

In particular, but not exclusively, if the second potential is ground potential, the first potential needs to be a non-zero potential. According to one embodiment, the first potential is a supply voltage supplied by a power source to which the measurement device is connected via a power supply line. The power source may be a voltage source or a current source. In other words, the supply voltage does not need to be a constant voltage. The power supply line—like the first ground line—can be any kind of conductor path, wire or cable adapted to conduct electrical current. It may also be a bundle of wires.

The structure may be directly connected to the second potential, e.g. the structure may be connected mechanically to a component that has the second potential. However, in many cases, such connections are not reliable. According to a preferred embodiment, the structure is connected to the second potential by a second connecting line. The second connecting line may be designed similar to the first connecting line.

In this context, it is preferred that at least a portion of the structure is connected in series between the first and second connecting line. In other words, the first and second connecting lines are only connected indirectly via the structure. Thus, it can be assured that the measurement device becomes inoperable if the structure is not connected to the second potential.

According to one embodiment, the structure may be a frame to which the sensing electrode is at least indirectly mounted, e.g. a seat frame of a vehicle seat or a frame of a steering wheel. According to another embodiment, the structure is a ground electrode, i.e. an electrode that should be maintained at ground potential. This electrode may be disposed in the vicinity of the sensing electrode and by its grounded condition influences the electric field generated by the sensing electrode. In this embodiment, the second potential is ground potential. In some applications it might in fact be an advantage to have close to the sensor a defined GND electrode to enlarge e.g. coupling signals. These intended GND structures are meant and these ones can be monitored in the same way as parasitic structures like the seat frame.

It is also possible to verify that a plurality of conducting structures (e.g. ground electrodes) have a certain potential (e.g. ground potential). According to such an embodiment, a plurality of conducting structures are connected in series between the second potential and the first connecting line. In other words, the measurement device is connected by the first connecting line to a first structure, which in turn is connected to a second structure. Optionally, a third structure, fourth structure and so on may be connected in series, with the last structure being connected to the second potential. According to this setup, the measurement device can only be (fully) operable if all structures are connected to the second potential. This can be achieved by simple wiring, which only requires a connecting line between each pair of consecutive structures. In particular, the structures may be ground electrodes and the second potential may be ground potential.

In many applications, the results of the measurements of the measurement device need to be communicated to some other device. E.g. in the case of an occupancy sensor, the result of the measurement has to be communicated to other systems like a seat belt reminder or some active safety system like an airbag activator. Therefore, it is preferred that the measurement device is connected to a communication line for communication with another device. The communication line may be part of a bus system (e.g. together with the power supply line) and may comprise a plurality of wires. Communication may be one-way or two-way, digital or analogue.

It is preferred that operability of the measurement device is detectable by another device through the communication line. In other words, another device can determine whether or not the measurement device is (fully) operable by receiving communication through the communication line or not receiving such communication. Normally, the measurement device is in an off state or a not-communicating state if it is not connected to the second potential. Thus, other devices cannot receive any signals from the measurement device through the communication line.

Normally, the measurement device, apart from detecting the capacitance of the sensing electrode, also processes the measurement result in order to identify whether there is an object in the detection space or not. In particular, the measurement device may be configured to output a signal indicative of the presence of the object. Such a signal may be output to the other device via the communication line. It may be a simple "binary" signal like "object present/not present" or it may contain some information on the classification of the object, e.g. the case of an occupancy sensor whether an adult or a child is seated on the respective seat.

As mentioned above, the sensor arrangement may be used for an occupancy sensor. In such a case, the conducting structure is normally part of a vehicle interior, in particular of a vehicle seat. For instance, it may be a seat pan or seat frame made of metal. Also, the measurement device may be configured to detect the presence of an occupant on the vehicle seat. In other applications, the sensor arrangement may be used for hands-off detection, i.e. to detect whether at least one of the driver's hands is in contact with the steering wheel or not. In that case, the conducting structure is part of the vehicle steering wheel, e.g. the steering wheel frame or steering wheel core.

BRIEF DESCRIPTION OF THE DRAWINGS

Further details and advantages of the present invention will be apparent from the following detailed description of not limiting embodiments with reference to the attached drawings, wherein.

DESCRIPTION OF THE ILLUSTRATED EMBODIMENTS

Figure 1:
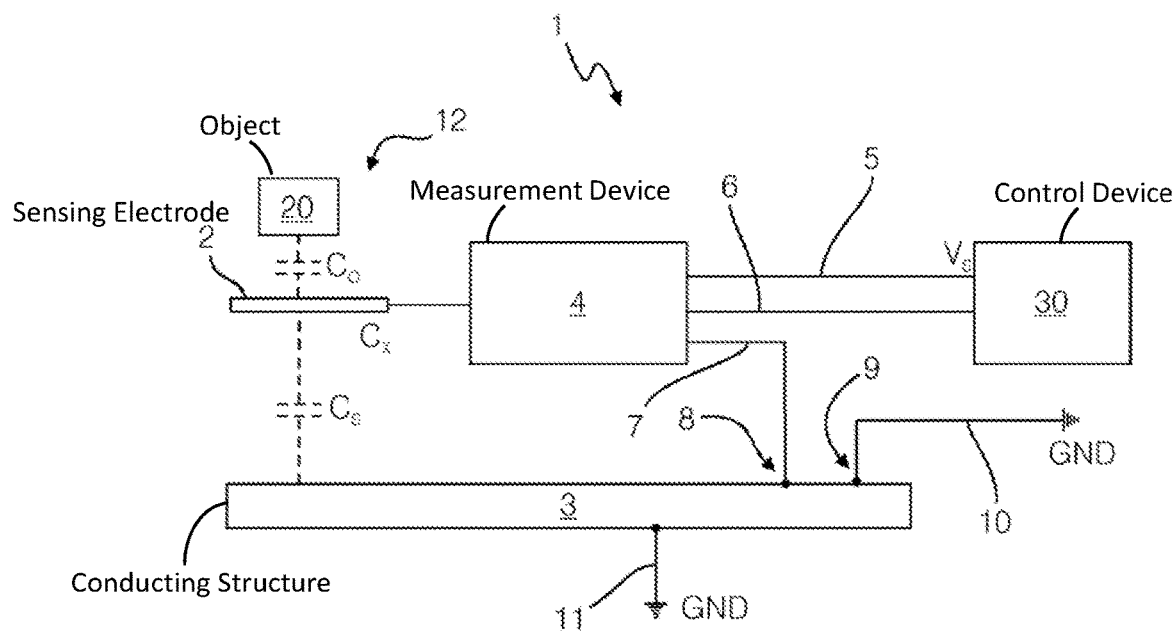
FIG. 1 is a schematic view showing a first embodiment of an inventive capacitive sensor arrangement.

FIG. 1 by way of example illustrates a first embodiment of a capacitive sensor arrangement 1 according to the invention. The sensor arrangement 1 comprises a sensing electrode 2 which could be arranged in a vehicle seat as an occupancy sensor. The sensing electrode 2 is associated with a capacitance $C_X$ relative to ground. The capacitance $C_X$ is unknown and varies with the presence of an object 20 entering a detection space 12 of the sensing electrode 2. The object 20 could be the body of a person. The part of the capacitance $C_X$ associated with the object 20 may be described as $C_O$. However, the total capacitance of the sensing electrode 2 also comprises a contribution $C_S$ which results from the presence of a conducting structure 3 in the vicinity of the sensing electrode 2. The conducting structure 3 may be a metal structure like a seat frame in the vehicle or a metal core of the steering wheel. It could also be a ground electrode, i.e. an electrode that needs to be kept at ground potential. This capacitance $C_S$ and therefore the total capacitance $C_X$ largely depends on whether the structure 3 is connected to ground or not.

The sensing electrode 2 is connected to a measurement device 4 which is configured to detect the total capacitance $C_X$ of the sensing electrode 2. For this purpose, the measurement device 4 may apply a sinusoidal voltage to the sensing electrode 2 and detect the flowing current. It is well-known that the capacitance is directly related to the current, the voltage and the frequency of the alternating voltage. In order to operate, the measurement device 4 needs to be supplied externally with power. A power supply line 5 is connected to the measurement device and to a control device 30, which supplies a first potential, namely a supply voltage $V_S$, e.g. from a vehicle battery, a generator or the like. The measurement device 4 is also connected to the control device 30 by a communication line 6, which may be part of one the same bus connection as the power supply line 5. The measurement device 4 may be configured to determine whether the object 20 is present or not and output a signal via the communication line 6 indicating the presence of the object 20. Also, the control device 30 may be able to detect whether or not the measurement device 4 is operable by the status of the communication line. E.g. if no communication from the measurement device 4 is received for a predetermined amount of time, this may be interpreted by the control device 30 as an inoperable state or off state of the measurement device 4.

The measurement device 4 is connected in series between the power supply line 5 and a first connecting line 7. While the power supply line 5 supplies the supply voltage $V_S$ to the measurement device 4, the latter only becomes operable when it is connected to a second potential, namely ground potential GND, via the first connecting line 7. The first connecting line 7 is connected to the structure 3 at a first connection point 8. Therefore, operability of the measurement device 4 depends on whether the structure 3 is connected to ground potential GND or not.

A second connecting line 10 is connected to the structure 3 at a second connection point 9. This second connecting line 10 is directly connected to ground potential GND. Therefore, as long as the first and second connecting lines 7, 10 are intact, the measurement device 4 is operable and the measurement results are reliable since the structure 3 is connected to ground potential GND. It should be noted that the structure 3 may further be connected to ground potential GND by a secondary connection 11, which could be due to a mechanical connection to ground. E.g. if the structure 3 is a vehicle seat frame, this seat frame is mounted directly or indirectly to the vehicle body, which could also imply an electrical connection. However, such an electrical connection may be unreliable compared to the second connecting line 10.

If the first connecting line 7 is disconnected or both the second connecting line 10 and the secondary connection 11 are disconnected, the measurement device 4 becomes inoperable. In this case, it cannot communicate with the control device 30, which detects the inoperability of the measurement device 4 and may output a corresponding warning signal.

In the embodiment shown, both connection points 8, 9 are located spaced-apart on the structure 3 so that at least a portion of the structure 3 is connected in series between the first connecting line 7 and the second connecting line 10. Therefore, the measurement device 4 is connected to ground potential GND exclusively via the structure 3 i.e. there is no connection of the measurement device 4 to ground potential GND except through the structure 3.

Figure 2:
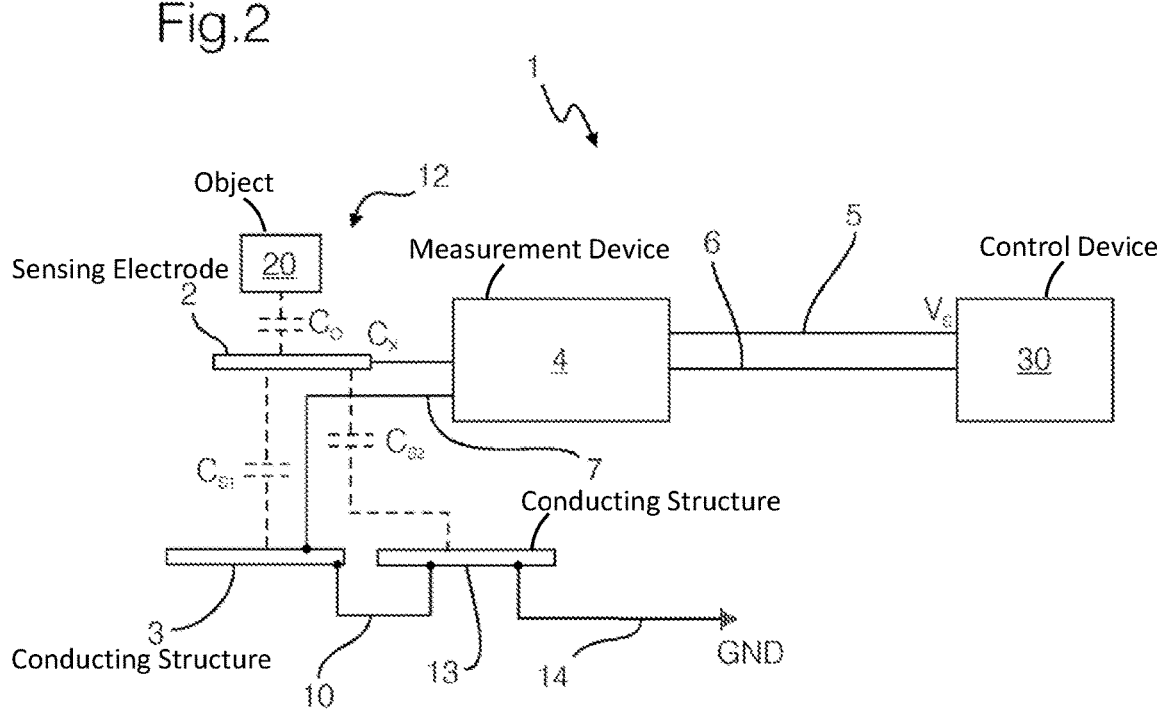
FIG. 2 is a schematic view showing a second embodiment of an inventive capacitive sensor arrangement.

FIG. 2 illustrates a second embodiment of a capacitive sensor arrangement 1 according to the invention. This embodiment is largely identical to the embodiment shown in FIG. 1 and insofar will not be explained again. However, in this embodiment, there are two conducting structures 3, 13 which may represent ground electrodes of the sensor arrangement, i.e. electrodes that are supposed to be kept at ground potential GND. As indicated in the figure, an electric field between the sensing electrode 2 and each of the structures (ground electrodes) 3, 13 gives rise to contributions $C_{S1}$, $C_{S2}$ to the total capacitance $C_X$. These capacitances $C_{S1}$, $C_{S2}$—and therefore the total capacitance $C_X$—depend on whether the structure 3, 13 is connected to ground potential GND or not.

The first structure 3 is connected to the measurement device 4 by a first connecting line 7. The second structure 13 is connected to the first structure 3 by a second connecting line 10 and is connected to ground potential GND by a third connecting line 14. All in all, the measurement device 4 is connected for power supply between the supply voltage $V_S$ and the ground potential GND. If any of the first, second or third connection line 7, 10, 14 is disconnected, the measurement device 4 becomes inoperable. At the same time, disconnection of the second or third connection line 10, 14 means that at least one of the structures 3, 13 is no longer connected to ground potential GND. In such a case, the potential of at least one structure 3, 13 would be floating, which would make any measurement of the total capacitance $C_X$ unreliable. Since the structures 3, 13 are connected in series between the ground potential GND and the first connecting line 7, the grounded condition of both structures 3, 13 can be easily monitored by monitoring the operational state of the measurement device 4. It is understood that the embodiment shown in FIG. 2 could be extended to more than two structures 3, 13, all of which would be connected in series.

The invention claimed is:

1. A capacitive sensor arrangement for detecting an object, comprising:
   a sensing electrode having a capacitance which depends on the presence of the object in a detection space;
   a measurement device connected to the sensing electrode and configured to detect the capacitance of the sensing electrode; and
   a conducting structure, wherein the capacitance of the sensing electrode depends on a potential of the structure;
   wherein the measurement device is configured to receive a supply of power between a first potential and a second potential, the measurement device being connected to the structure by a conductor, and to the second potential exclusively via the structure.

2. The capacitive sensor arrangement according to claim 1, wherein the conductor connecting the measurement device to the structure is a first connecting line.

3. The capacitive sensor arrangement according to claim 2, wherein the measurement device is operable when the first connecting line is at least indirectly connected to the second potential.

4. The capacitive sensor arrangement according to claim 2, wherein a plurality of conducting structures are connected in series between the second potential and the first connecting line.

5. The capacitive sensor arrangement according to claim 1, wherein the first potential is a supply voltage supplied by a power source to which the measurement device is connected via a power supply line.

6. The capacitive sensor arrangement according to claim 1, wherein the structure is connected to the second potential by a second connecting line.

7. The capacitive sensor arrangement according to claim 1, wherein at least a portion of the structure is connected in series between a first and a second connecting line.

8. The capacitive sensor arrangement according to claim 1, wherein the structure is a ground electrode.

9. The capacitive sensor arrangement according to claim 1, wherein the measurement device is connected to a communication line for communication with another device.

10. The capacitive sensor arrangement according to claim 9, wherein operability of the measurement device is detectable by another device through the communication line.

11. The capacitive sensor arrangement according to claim 1, wherein the measurement device is configured to output a signal indicative of the presence of the object.

12. The capacitive sensor arrangement according to claim 1, wherein the structure is part of a vehicle seat or a steering wheel.

13. The capacitive sensor arrangement according to claim 12, wherein the measurement device is configured to detect the presence of an occupant on the vehicle seat.

14. The capacitive sensor arrangement according to claim 12, wherein the measurement device is configured to detect whether at least one hand is in contact with the steering wheel.

15. The capacitive sensor arrangement according to claim 1, wherein the second potential is ground potential (GND).

\* \* \* \* \*